(12) United States Patent
Lin

(10) Patent No.: US 7,090,604 B2
(45) Date of Patent: Aug. 15, 2006

(54) BELT TENSIONING DEVICE

(75) Inventor: Tsung-Te Lin, Taipei (TW)

(73) Assignee: BenQ Corporation, Tao-Yuan Hsien (TW)

( * ) Notice: Subject to any disclaimer, the term of this patent is extended or adjusted under 35 U.S.C. 154(b) by 229 days.

(21) Appl. No.: 10/605,853

(22) Filed: Oct. 30, 2003

(65) Prior Publication Data

US 2005/0096165 A1 May 5, 2005

(51) Int. Cl.
*B41J 19/20* (2006.01)

(52) U.S. Cl. ..................................... 474/109
(58) Field of Classification Search ............... 474/101, 474/109, 111, 140; 400/352, 354; 399/162, 399/165; 358/471, 474, 497, 400
See application file for complete search history.

(56) References Cited

U.S. PATENT DOCUMENTS

| | | | | |
|---|---|---|---|---|
| 5,232,407 A | * | 8/1993 | Wolf et al. | 474/101 |
| 5,662,539 A | * | 9/1997 | Schmidtke et al. | 474/101 |
| 6,076,446 A | * | 6/2000 | Onishi et al. | 83/487 |
| 6,257,781 B1 | * | 7/2001 | Harris | 400/323 |
| 6,377,364 B1 | * | 4/2002 | Short et al. | 358/474 |
| 6,508,534 B1 | * | 1/2003 | Yusef et al. | 347/37 |
| 6,540,419 B1 | * | 4/2003 | Plumley et al. | 400/582 |
| 6,860,828 B1 | * | 3/2005 | Huang | 474/101 |

FOREIGN PATENT DOCUMENTS

DE 3739272 A1 * 6/1989

* cited by examiner

*Primary Examiner*—Vicky A. Johnson
(74) *Attorney, Agent, or Firm*—Winston Hsu

(57) ABSTRACT

An adjusting device provided on a transmission belt to adjust the tension of the transmission belt. The adjusting device includes a housing and a fastener fixed on the housing, the fastener engaging the transmission belt so that there is no relative displacement between the fastener and the transmission belt. A sliding mechanism is disposed on the housing and is capable of sliding in a linear direction on the housing, the sliding mechanism engaging the transmission belt so that there is no relative displacement between the sliding mechanism and the transmission belt. An elastic device is fixed to the housing at a first end and fixed to the sliding mechanism at a second end for maintaining proper tension in the transmission belt.

9 Claims, 12 Drawing Sheets

BELT TENSIONING DEVICE

BACKGROUND OF INVENTION

1. Field of the Invention

The present invention relates to a belt tension adjusting device, and more particularly to a device for adjusting the tension state of a transmission belt of an optical scanning apparatus.

2. Description of the Prior Art

Please refer to FIG. 1. FIG. 1 illustrates a prior art drive system 10 taught in U.S. Pat. No. 5,106,345 by Moore et al, which is herein incorporated by reference. The drive system 10 includes a belt 26 having teeth 28 adapted to engage gears 36 and 38 in a device such as a printer or a scanner. The system also includes a tensioner 32 which applies tension to the belt 26.

Please refer to FIG. 2 and FIG. 3. FIG. 2 and FIG. 3 are schematic diagrams of a resilient means 148 for maintaining proper tension in a drive belt 136. The resilient means 148 is taught in U.S. Pat. No. 5,323,407 by Wolf et al, which is herein incorporated by reference. The resilient means 148 may comprise a coiled spring 150 having a first hook portion 152 extending from one end of the coiled spring 150 and a second hook portion 154 extending from the other end of the coiled spring 150. The first hook portion 152 has a first linear portion 156 integral with the coiled spring 150, a second linear portion 158 integral with and extending in a direction substantially perpendicular to the first linear portion 156 and a hook extension 160 integral with and extending in a direction substantially perpendicular to the second linear portion 158. The second hook portion 154 has a first linear portion 162 integral with the coiled spring 150, a second linear portion 164 integral with and extending in a direction substantially perpendicular to the first linear portion 162 and a hook extension 166 integral with and extending in a direction substantially perpendicular to the second linear portion 164.

The operational relationship between a portion 168 of the drive belt 136 and the resilient means 148 is illustrated in FIG. 3. The portion 168 passes under the second linear portion 158, over the coiled spring 150 and under the second linear portion 164. As it passes under the second linear portions 158 and 164, the portion 168 is located between a portion of the first linear portions 156 and 162 and a portion of the hook extensions 160 and 166.

The frictional forces generated by the force of the coiled spring 150 urging the second linear portions 158 and 164 against the surface of the portion 168 of the drive belt 136 will be enough to prevent any substantial relative movement between the portion 168 and the second linear portions 158 and 164. However, to ensure against any substantial relative movement, the surface of the second linear portions 158 and 164 contacting the portion 168 could be provided with a friction generating rib or roughened surface. Similarly, the belt portion 168 could be provided with a ribbed or other friction increasing surface. In operation, any slackness occurring in the other portions of the drive belt 136 would permit the second linear portions 158 and 164 to move toward each other while still maintaining a substantially constant tension on the drive belt 136. Also, any shortening in other portions of the drive belt 136, such as caused by a change in temperature, would cause the second linear portions 158 and 164 to move away from each other while still maintaining a substantially constant tension on the belt.

Please refer to FIG. 4 and FIG. 5. FIG. 4 and FIG. 5 show two common ways of adjusting the tension of transmission belts of scanners. In FIG. 4, a slide block pulley type is shown. It comprises a slide block 52, a spring 51, a belt 53, a carrier 54, and pulleys 55. FIG. 5 shows a rocker arm adjusting type, which includes an adjusting wheel 63, a spring 51, a belt 53, pulleys 55, a rocker arm 62, a carrier 54, a scanner frame 71, a glass surface 72, and a document 73. In both types as shown in FIG. 4 and FIG. 5, either slide blocks or rocker arms are required. This may cause damage to the belt, and the belt may become loosened, causing the transmission state of the transmission belt to slide during adjustment. Besides, the moving parts may wear, resulting in deflection of the tension of the transmission belt and defective transmission. In addition, there are numerous parts and components, which means increase in costs and reduction in competitiveness. All of these are problems that need to be solved.

SUMMARY OF INVENTION

It is therefore a primary objective of the claimed invention to provide a belt tensioning device for maintaining proper tension in a transmission belt in order to solve the above-mentioned problems.

According to the claimed invention, an adjusting device provided on a transmission belt to adjust the tension of the transmission belt is disclosed. The adjusting device includes a housing and a fastener fixed on the housing, the fastener engaging the transmission belt so that there is no relative displacement between the fastener and the transmission belt. A sliding mechanism is disposed on the housing and is capable of sliding in a linear direction on the housing, the sliding mechanism engaging the transmission belt so that there is no relative displacement between the sliding mechanism and the transmission belt. An elastic device is fixed to the housing at a first end and fixed to the sliding mechanism at a second end for maintaining proper tension in the transmission belt.

It is an advantage of the claimed invention that the fastener and the sliding mechanism are both formed on the housing of the adjusting device, and both are attached to the transmission belt. The elastic device is attached to the housing at the first and to the sliding mechanism at the second end, and the sliding mechanism slides in order to maintain proper tension in the transmission belt.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
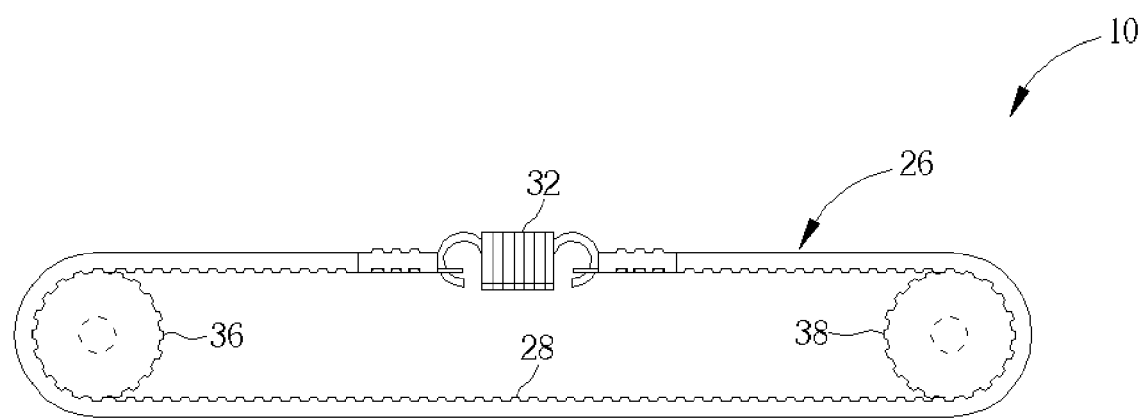
FIG. 1 illustrates a prior art drive system.
Figure 2:
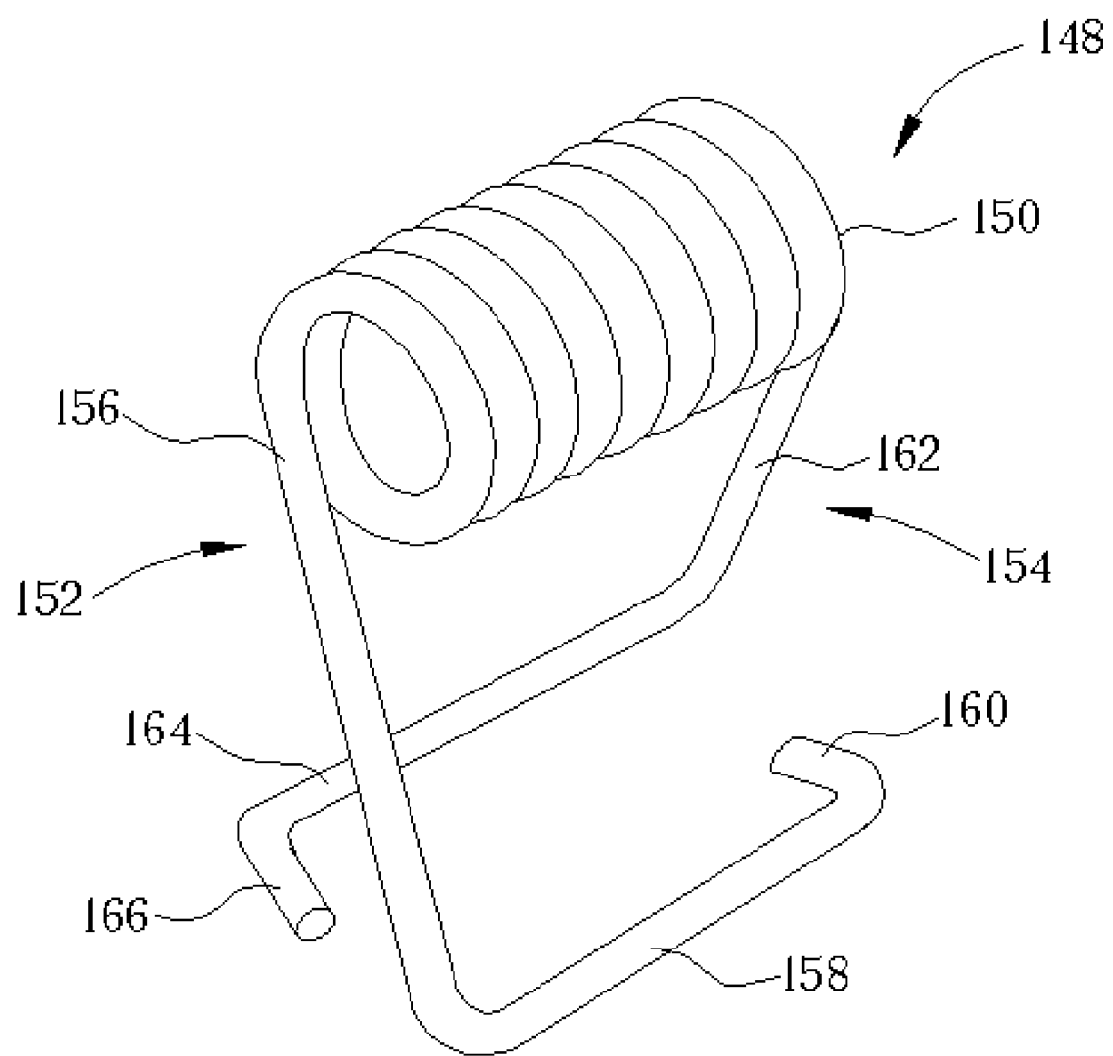
FIG. 2 and FIG. 3 are schematic diagrams of a resilient means for maintaining proper tension in a drive belt.
Figure 3:
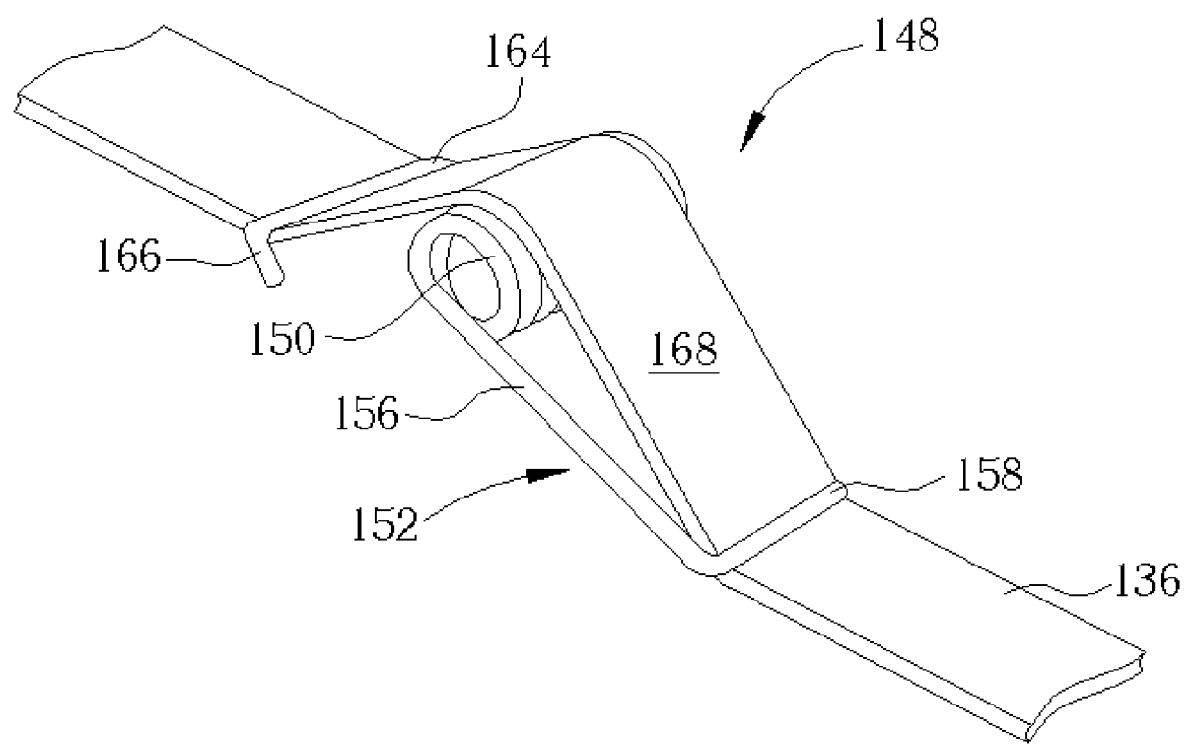
Figure 4:
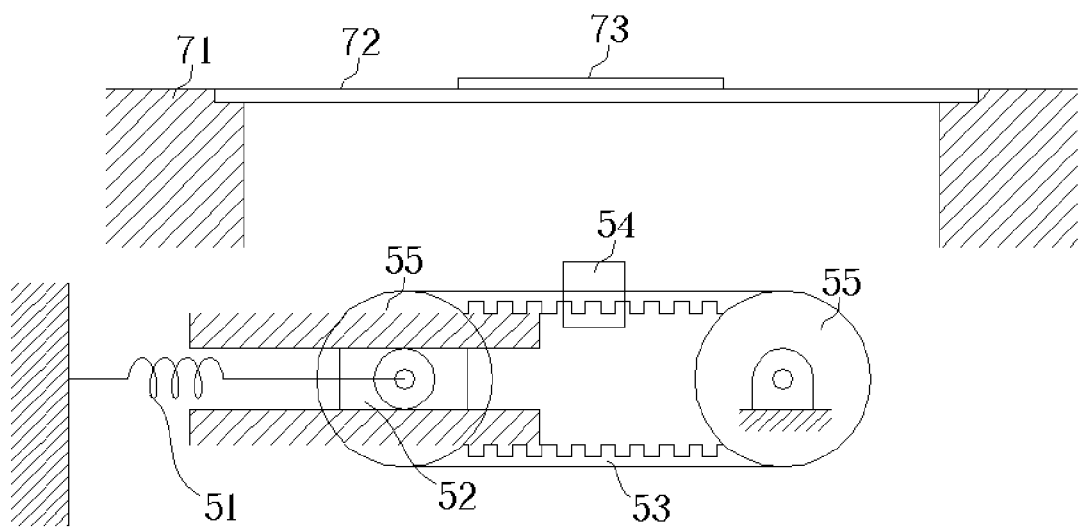
FIG. 4 and FIG. 5 show two common ways of adjusting the tension of transmission belts of scanners.
Figure 5:
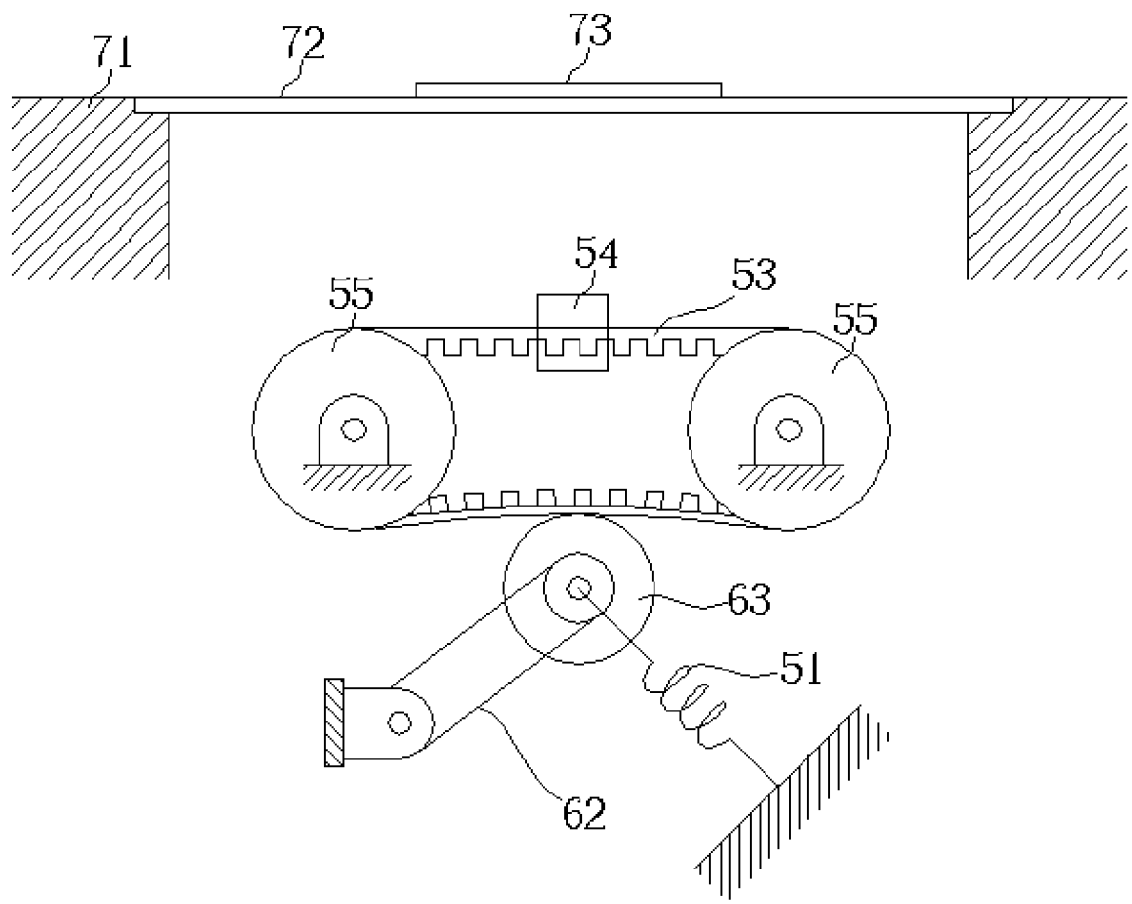
Figure 6:
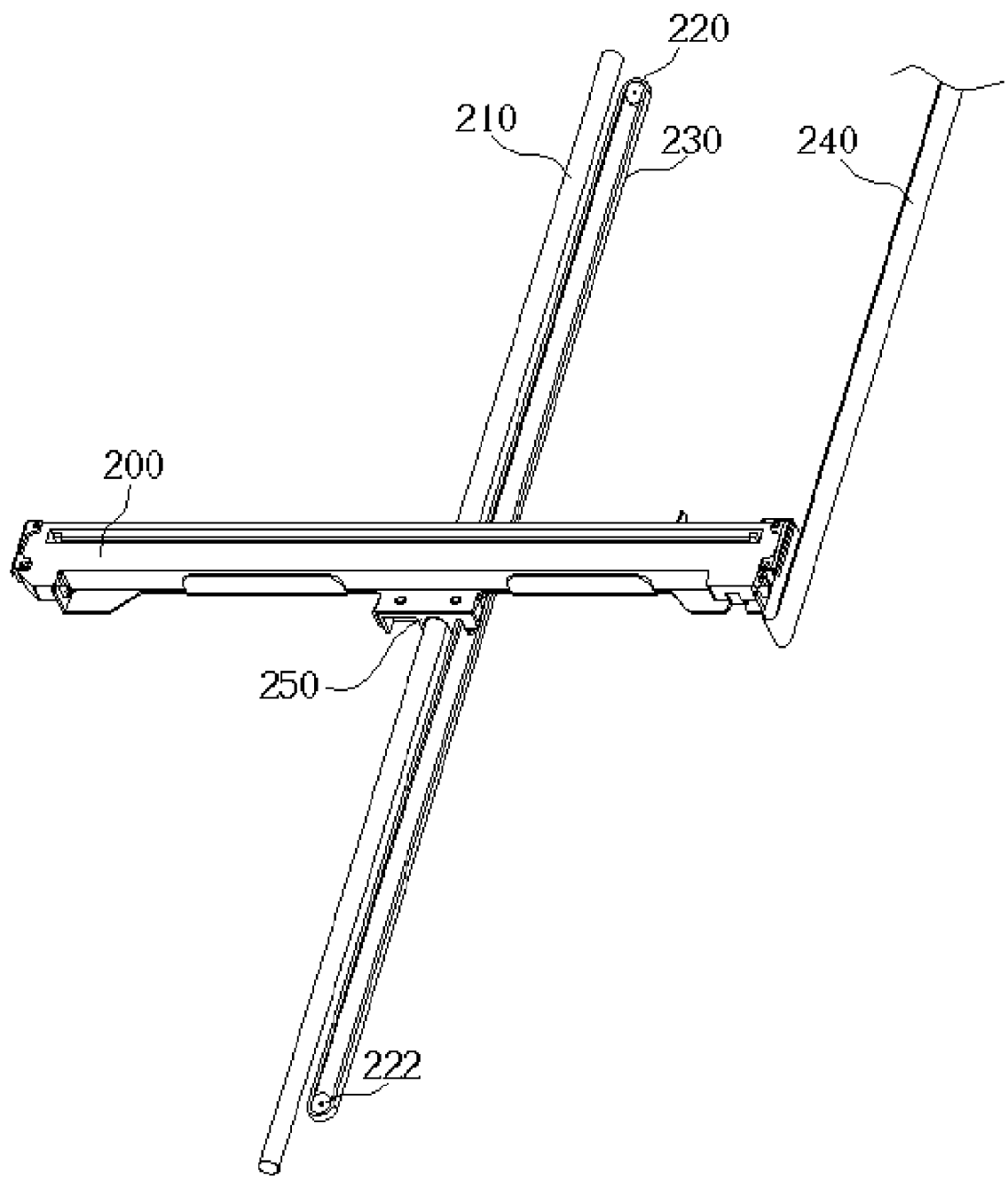
FIG. 6 is a schematic diagram of a present invention drive system for driving a scanning module attached to a timing belt through a carriage.

Please refer to FIG. 6. FIG. 6 is a schematic diagram of a present invention drive system for driving a scanning module 200 attached to a timing belt 230 through a carriage 250. Two pulleys 220 and 222 are used for rotating the timing belt 230, thereby moving the scanning module 200 up and down a shaft 210 for scanning a document. A data cable 240 is connected to the scanning module 200 for transferring image data acquired by the scanning module 200 to a digital signal processor. Please note that the scanning module 200 is used as an example only, and can also be replaced by a printhead or other devices that can be transported by the timing belt 230.

Figure 7:
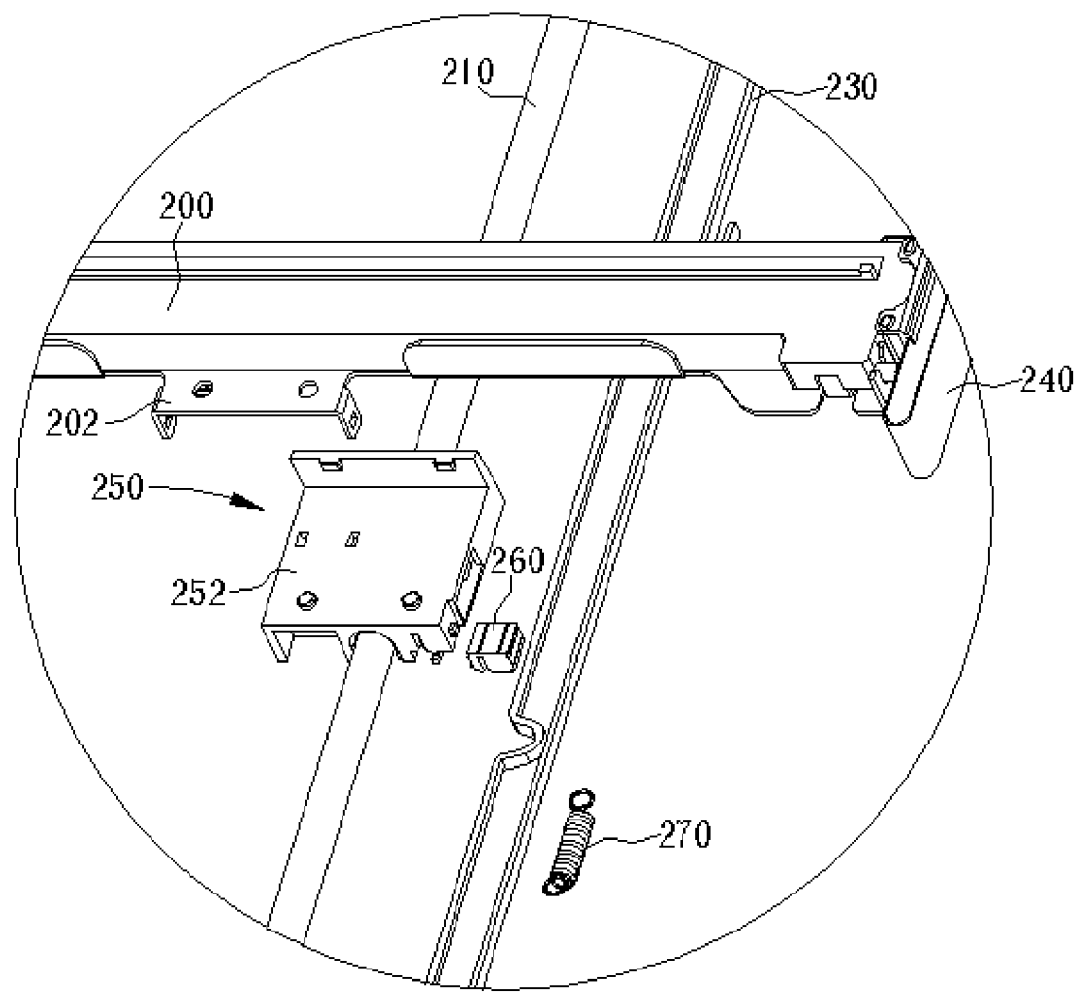
FIG. 7 is an exploded view of the drive system shown in FIG. 6.

Please refer to FIG. 7. FIG. 7 is an exploded view of the drive system shown in FIG. 6. The scanning module 200 contains a connecting plate 202 for securing the scanning module 200 to a housing 252 of the carriage 250. A sliding mechanism 260 is used in conjunction with a spring 270 for maintaining proper tension in the timing belt 230, as will be explained in greater detail below. The spring 270 can be replaced with any elastic device, but is preferably a helical spring.

Figure 8:
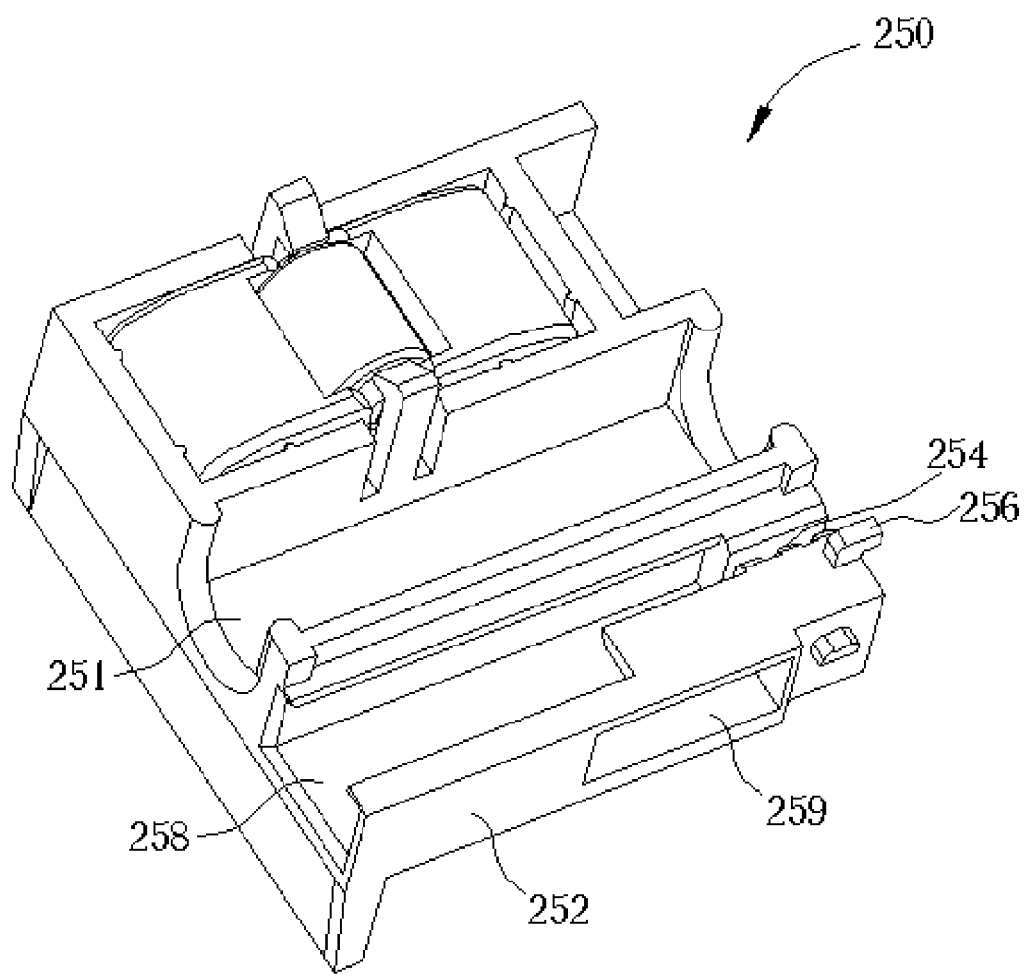
FIG. 8 is a diagram of the carriage without the sliding mechanism installed.

Please refer to FIG. 8. FIG. 8 is a diagram of the carriage 250 without the sliding mechanism 260 installed. The carriage 250 contains a shaft cavity 251 designed to enable the carriage 250 to travel along the shaft 210 in a linear direction. The housing 252 of the shaft 210 contains a first fastener 254 for fixing the timing belt 230 to the housing 252 such that there is no relative displacement between the first fastener 254 and the timing belt 230. In addition, a first retaining post 256 is also formed on the housing 252 for securing one end of the spring 270. A sliding track 258 is formed on the housing 252 of the carriage 250, and is designed to allow the sliding mechanism 260 to slide back and forth in the sliding track 258. The carriage 250 also contains a hole 259 through which any slack portion of the timing belt 230 may pass through.

Figure 9:
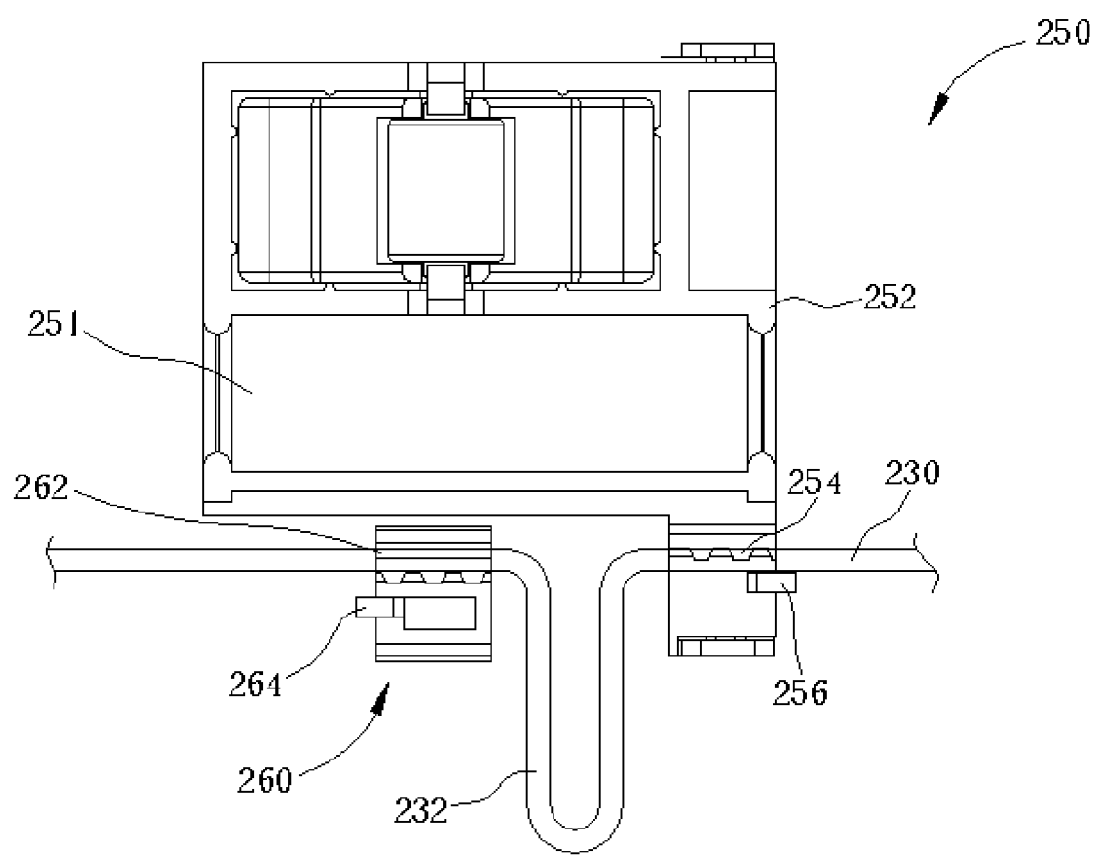
FIG. 9 and FIG. 10 are top views of the carriage with the sliding mechanism in different positions on the sliding track.
Figure 10:
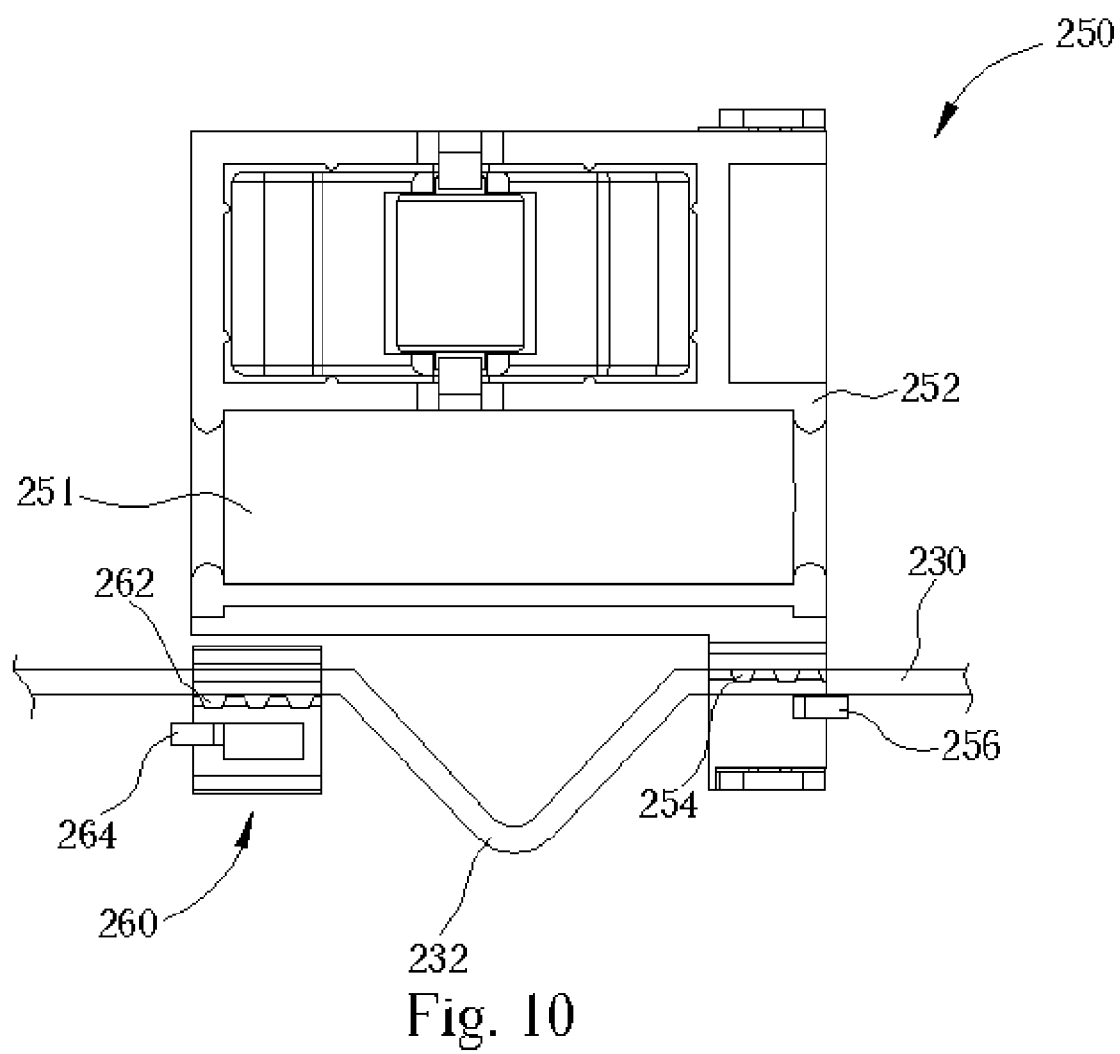

Please refer to FIG. 9 and FIG. 10. FIG. 9 and FIG. 10 are top views of the carriage 250 with the sliding mechanism 260 in different positions on the sliding track 258. The sliding mechanism 260 contains a second fastener 262 for fixing the timing belt 230 to the sliding mechanism 260 such that there is no relative displacement between the second fastener 262 and the timing belt 230. In addition, the sliding mechanism 260 contains a second retaining post 264 for securing the other end of the spring 270. The spring 270 is therefore secured at one end to the first retaining post 256 on the housing 252 of the carriage 250 and secured at the other end to the second retaining post 264 on the sliding mechanism 260. A section 232 of the timing belt 230 is left slack between the first fastener 254 and the second fastener 262, and this section 232 is what allows the timing belt 230 to maintain proper tension. In FIG. 9 and FIG. 10, the spring 270 is not shown so that the section 232 of the timing belt 230 can be seen more clearly.

The difference between FIG. 9 and FIG. 10 is the position of the sliding mechanism 260 in the sliding track 258. In FIG. 9, the sliding mechanism 260 is closer to the first fastener 254, and the section 232 of the timing belt 230 has more slack. On the other hand, in FIG. 10, the sliding mechanism 260 is farther from the first fastener 254, and the section 232 is tauter.

Figure 11:
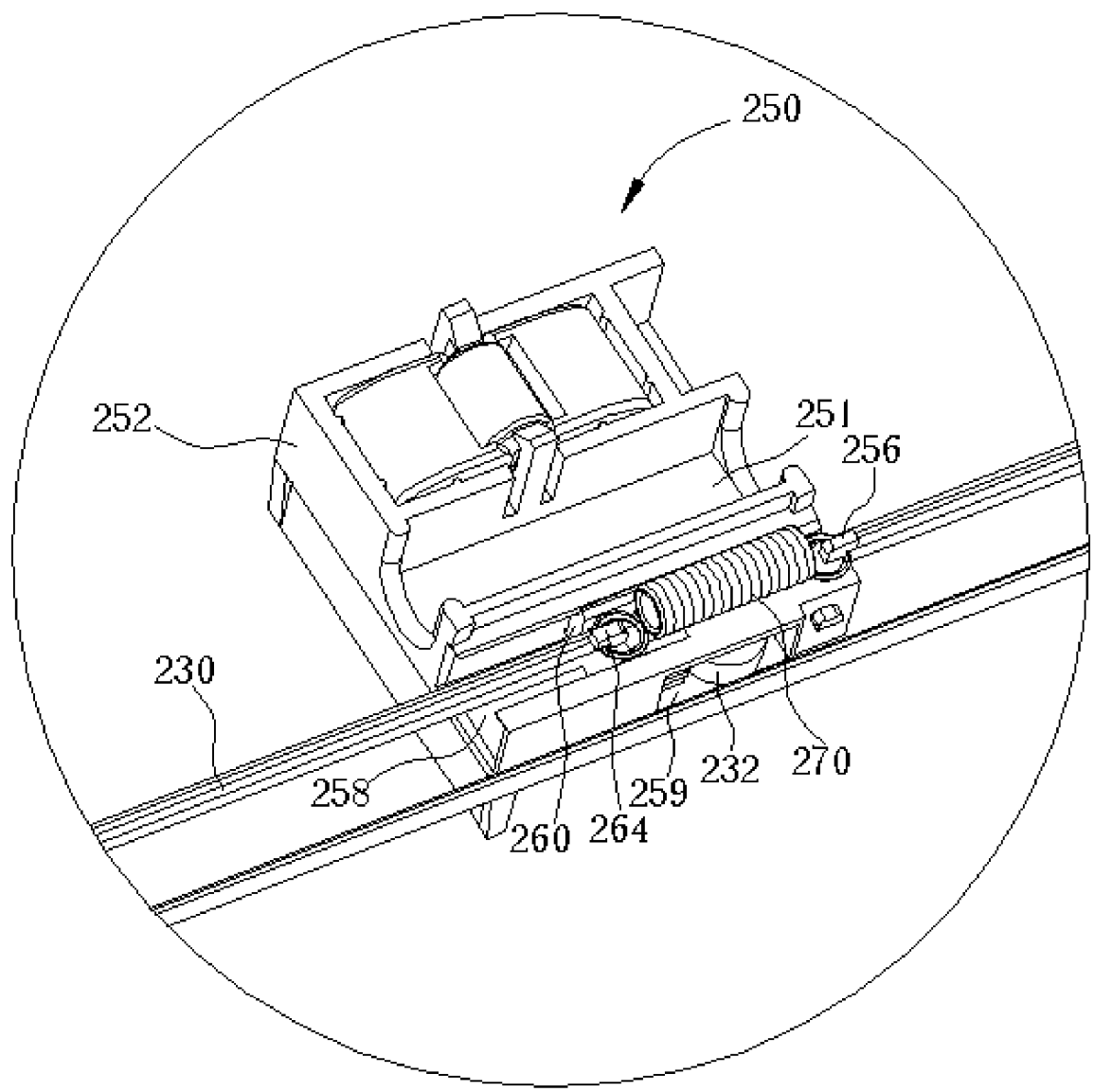
FIG. 11 and FIG. 12 are perspective views of the carriage with the sliding mechanism in different positions on the sliding track.
Figure 12:
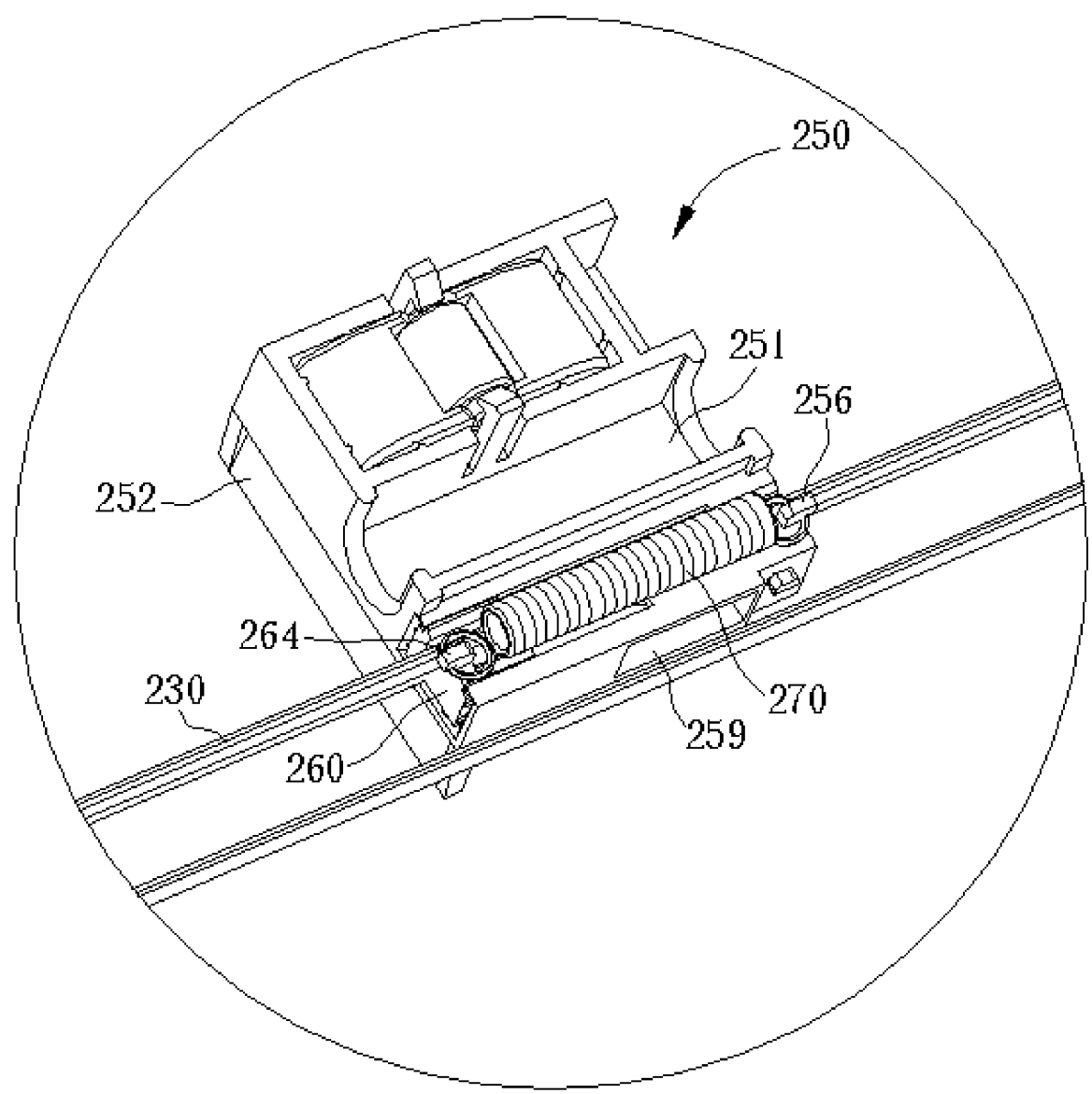

Please refer to FIG. 11 and FIG. 12. FIG. 11 and FIG. 12 are perspective views of the carriage 250 with the sliding mechanism 260 in different positions on the sliding track 258. In FIG. 11, the sliding mechanism 260 is at a position of the sliding track 258 closest to the first fastener 254. In this case, the spring 270 is stretched only a small amount, and the section 232 of the timing belt 230 has enough slack to pass through the hole 259 of the housing 252. In FIG. 12, the sliding mechanism 260 is at a position of the sliding track 258 farthest from the first fastener 254. Thus, the spring 270 is stretched much more, and the section 232 of the timing belt 230 is too taut to pass through the hole 259 of the housing 252.

In summary, the present invention discloses the carriage 250 having a belt tensioning device built into the carriage 250. The spring 270 is attached to the first retaining post 256 of the housing 252 at one end and to the second retaining post 264 of the sliding mechanism 260 at the other end for maintaining proper tension in the timing belt 230. The spring 270 expands and contracts in the same direction that the timing belt 230 moves in, and therefore enables the spring 270 to quickly adjust the tension of the timing belt 230 to maintain the proper level of tension.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An adjusting device provided on a transmission belt to adjust the tension of the transmission belt, the device comprising:

a housing;

a fastener fixed on the housing, the fastener engaging the transmission belt so that there is no relative displacement between the fastener and the transmission belt;

a sliding mechanism disposed on the housing for sliding in a linear direction on the housing, the sliding mechanism engaging the transmission belt so that there is no relative displacement between the sliding mechanism and the transmission belt; and an elastic device fixed to the housing at a first end and fixed to the sliding mechanism at a second end for maintaining proper tension in the transmission belt.

2. The device of claim 1 wherein a sliding track is disposed on a surface of the housing, and the sliding mechanism slides along the sliding track.

3. The device of claim 2 wherein a path of the sliding track is parallel with a linear direction in which the transmission belt moves.

4. The device of claim 1 wherein the elastic device is a helical spring.

5. The device of claim 1 wherein the first end of the elastic device is fixed to a retaining post disposed on the housing.

6. The device of claim 5 wherein the elastic device urges the sliding mechanism towards the retaining post for maintaining proper tension in the transmission belt.

7. The device of claim 1 wherein the transmission belt is a timing belt.

8. The device of claim 1 wherein the fastener clamps the transmission belt.

9. The device of claim 1 wherein the sliding mechanism clamps the transmission belt.

* * * * *